United States Patent [19]
Disque et al.

[11] 3,935,103
[45] Jan. 27, 1976

[54] APPARATUS FOR SEPARATING LOW-DENSITY LIQUID FROM A RELATIVELY MORE DENSE LIQUID SUBSTANTIALLY IMMISCIBLE THEREWITH

[75] Inventors: Karl Disque; Helmut Hölzgen; Philipp Stauch, all of Neustadt, Germany

[73] Assignees: Erdöl-Raffinerie Neustadt GmbH & Co., Neustadt, Germany; King-Wilkinson, Inc., Tulsa, Okla.

[22] Filed: Dec. 3, 1973

[21] Appl. No.: 421,492

[30] Foreign Application Priority Data
Dec. 2, 1972   Germany.......................... 2259141

[52] U.S. Cl. ............ 210/97; 210/DIG. 21; 210/242
[51] Int. Cl.² ........................................ E02B 15/04
[58] Field of Search ........ 210/83, 97, 242, DIG. 21, 210/513, 532

[56] References Cited
UNITED STATES PATENTS

| | | | |
|---|---|---|---|
| 2,330,508 | 9/1943 | McColl .............................. | 210/242 |
| 2,497,177 | 2/1950 | McClintock et al. ........... | 210/242 X |
| 2,661,094 | 12/1953 | Stewart ............................. | 210/242 |
| 3,534,859 | 10/1970 | Amero et al. ................. | 210/DIG. 21 |
| 3,631,984 | 1/1972 | Path ............................. | 210/DIG. 21 |
| 3,702,134 | 11/1972 | Henning, Jr. et al ........ | 210/DIG. 21 |
| 3,702,297 | 11/1972 | Maksim, Jr. ................. | 210/DIG. 21 |
| 3,727,765 | 4/1973 | Henning, Jr. et al. ........ | 210/DIG. 21 |
| 3,730,346 | 5/1973 | Prewitt........................ | 210/DIG. 21 |

*Primary Examiner*—Theodore A. Granger
*Attorney, Agent, or Firm*—Karl F. Ross; Herbert Dubno

[57] ABSTRACT

An apparatus for separating a relatively low density liquid such as oil from a relatively more dense liquid, e.g. water, substantially immiscible therewith, comprises a vessel in which the two liquids form strata, and a trough in the vessel is provided with a pair of floats. At least one of the floats is internally subdivided into at least a pair of laterally spaced trim chambers interconnected by a tube so that the introduction of compressed air into one chamber displaces trim liquid into the other and causes rotation of the float about an axis parallel to the trough so that the overlying liquid can flow over the edge of the trough into the latter when this edge is canted beneath the liquid surface.

6 Claims, 8 Drawing Figures

APPARATUS FOR SEPARATING LOW-DENSITY LIQUID FROM A RELATIVELY MORE DENSE LIQUID SUBSTANTIALLY IMMISCIBLE THEREWITH

FIELD OF THE INVENTION

The present invention relates to an apparatus for separating a relatively low-density liquid, e.g. oil, from a relatively high-density liquid, e.g. water, with which the low-density liquid is substantially immiscible.

BACKGROUND OF THE INVENTION

The separation of a relatively low-density liquid, e.g. oil or an organic solvent, from a relatively high-density liquid such as water with which the low-density liquid is substantially immiscible is required for many purposes. For example, oil and water mixtures may arise in oil refineries or in the removal of oil from bodies of water and can be introduced into decanting tank or vessels in which the two liquids are permitted to separate by stratification. The relatively low-density liquid forms a layer above the relatively high-density liquid and must be removed.

Simple decanting techniques whereby the low-density liquid is permitted to flow over a weir at a fixed location on the separation vessel have not proved to be effective for many purposes especially because the level of the liquid may vary.

There has also been suggested a portable floating device for drawing pumpable impurities from the surface of a body of water. This device comprises an upper open surface and floats carrying the collecting vessel which comprises an upper receptacle portion and a lower receptacle portion, the two portions being so interconnected that they permit relative vertical movement. The lower receptacle portion contains one or two immersion pumps. The upper edge of the upper receptacle portion lies substantially at the upper surface of the water and the depth to which the upper edge can be immersed can be controlled by regulating the floats.

This conventional system has, necessarily, a complex and costly construction and is not always satisfactory in operation. For example, it cannot be used in large clarifier or settling tanks whose lateral walls are of rectangular cross section and have lengths of 4 to 6 meters or more.

Such large clarifier or separating vessels are used in the petroleum industry, e.g. at refineries, for the separation of large quantities of waste water which may contain petroleum products. Such products must be removed from the surface of the water in the vessel so that, for example, they may be worked up to recover the valuable petroleum components.

OBJECTS OF THE INVENTION

It is the principal object of the present invention to provide an improved apparatus of the trough type for the withdrawal of a low-density liquid from the surface of a high-density liquid with which the low-density liquid is substantially immiscible.

Another object of this invention is to provide an apparatus of the general type described above wherein, however, the aforestated disadvantages are obviated.

Yet another object of the present invention is to provide a system for the removal of low-density liquid from a high-density liquid which is effective independently of the quantity of liquid in the separation vessel and has simple means for producing canting of the separation trough.

SUMMARY OF THE INVENTION

These objects and others which will become apparent hereinafter are attained, in accordance with the present invention, in an apparatus for the removal of a relatively light or low-density liquid from a heavier or relatively high-density liquid, especially the removal of oil from water, which comprises a separation vessel in which the two liquids have stratified, and a floating trough whose edges, in an uncanted position of the trough, lie just above the upper surface of the low-density liquid. A discharge arrangement is connected with the trough to carry off the liquid collected therein and the trough is provided, e.g. at its ends or more generally at two longitudinally spaced locations, with a pair of floats at least one of which is internally subdivided into at least two laterally spaced trim chambers connected by a tube or passage and communicating selectively with a source of compressed or pressurized gas and the atmosphere. According to the invention, trim water or another liquid is displaced from one of the chambers into the other, thereby canting the trough and bringing one of its edges below the surface of the low density liquid so that the latter can flow into the trough and be withdrawn. When the low density liquid is present in a large quantity the height of its layer is correspondingly large and the tilting or canting angle may be correspondingly increased so that the trough is rotated about its longitudinal axis to a greater extent. When the quantity of low density liquid is less, a smaller angle of canting or rotation may be effected and, of course, in the rest position of the trough both of its edges may overly the surface of the liquids in the vessel since no liquid need be withdrawn.

While the canting of the trough may be carried out in a number of ways, it is preferred to effect the canting solely by displacement of trim water in the manner described. The trough may be provided with a weighted keel tending to return it into its rest position although it is preferred in accordance with the present invention, to provide means for the displacement of the liquid from one trim chamber to the other to effect canting in either sense.

According to a more specific feature of this invention, the floats may be of circular configuration, e.g. cylindrical so that the rotary movement is effected about a horizontal axis.

It is an important feature of the invention that the rotation of the trough is effected without mechanical means, i.e. solely hydraulically, and to this end the control float or edge control float is provided internally with two laterally spaced partitions subdividing the interior of the float into three chambers. The central chamber may be charged with liquid to a selected level for adjustment of the height of the float and the trough while the outer chambers are interconnected as previously indicated, preferably at their lower portion. All three chambers may be formed with fittings connectible to valves by which a pressurized gas may be forced into the chamber and/or the chamber may be vented, to shift the trim water from one of the outer chambers to the other and/or to adjust the level of the liquid in the central chamber. Flexible hoses can be connected to these fittings and the valves may be located remote from the trough.

A discharge device, e.g. a further flexible hose, may be connected to the bottom of the trough to drain the liquid collected therein.

After the trough is set into the settling vessel, the two outer chambers are filled with water or another liquid to a maximum height of the horizontal axial plane of the assembly. Thereupon the inner chamber is charged with water until the float settles so that the trough has its edges, in an uncanted horizontal position, lying slightly above the surface of the liquid in the vessel. The valve of the central chamber can then be closed while the valves of the outer chambers remain open.

To cant the trough, the valve of one of the outer chambers is connected to a pressurized gas source while the valve of the other outer chamber remains open to the atmosphere. The pressurized gas (preferably compressed air) drives liquid from the first outer chamber into the second thereby shifting the center of gravity of the float and causing the rotation of the float and the trough about a longitudinal axis parallel to the edges of the trough. The canting angle is controlled by regulating the quantity of compressed air introduced into the outer chamber from which the ballast water is displaced. Similarly, the trough may be rotated in the opposite sense by closing the compressed air inlet to the first outer chamber and venting the latter to the atmosphere while introducing compressed air into the outer chamber containing most of the ballast water. A portion of the ballast is thereby displaced into the outer chamber.

While the stiffness of the trough makes it necessary to use only one control float, i.e. only one of the floats need be provided with the chambers, and the other float may simply be provided with ballast water to a level sufficient to maintain the edges of the trough horizonal (i.e. both ends of the trough at the same level), it has been found to be desirable, especially when the trough is of considerable length, to provide the second float as a control float as well.

Since no mechanical drive or control parts are connected to the float and trough assembly, breakdown is minimized.

To control the compressed air float and the setting of the angle of the trough, a Yaxley-type stacked-switch or valve arrangement is employed, the stacked controls providing the simultaneous feed of compressed air to one trim chamber and the venting of the other so that the ballast is displaced from one trim chamber to the other. The floats at opposite ends of the trough can be operated synchronically and simultaneously in this manner.

The use of the stacked or ganged control provides a further advantage that the control system can be remote from the trough and can, for example, be provided at an observation station at which the operating personnel are located and which may be separated by a window or the like from the tank.

The system may comprise a vessel or tank having a length greater than that of the trough and float assembly but preferably is carried out in a settling vessel whose width corresponds to the length of this assembly. It is possible in this arrangement to guide the assembly in the walls on opposite sides of the tank so that the surface of the liquid in the vessel is subdivided by the float/trough assembly into two parts. In each part, the low-density liquid may collect upon high-density liquid and the trough may be canted from side to side. Alternatively, the low-density liquid may be only on one side of the trough and the latter can be tilted in this direction. The liquid on the opposite side of the trough, substantially free from the low density layer, can be withdrawn. When the tank has a width greater than the length of the assembly, two or more such assemblies may be provided in aligned relationship across the width of the tank and, of course, a plurality of such assemblies may be disposed in spaced parallel relationship across the tank. All such assemblies can by synchronized for common operation by a single control means or may be individually controlled as required.

According to an important aspect of the invention, therefore, the apparatus for the removal of a low-density liquid floating upon a high density liquid, especially oil on water, comprises an elongated trough having a length which is greater relative to its width and an upwardly open mouth defined between a pair of horizontal upper edges which, in a rest position of the trough, i.e. just above the upper surface of the low-density layer. The two edges of the trough thus define weirs which can be selectively brought below the upper surface of the low density layer to permit the low-density liquid to flow into the trough while barring entry of the high-density liquid. The bottom of the trough converges or slopes to a central outlet from which the collected liquid is removed from the trough. The floats are so ballasted that the trough is swingable about its longitudinal axis which lies substantially in a plane corresponding to the liquid level and parallel to a plan defined by the upper edges of the trough in the rest position of the latter.

It is important to this aspect of the invention that the trough and float assembly extend the full span of the vessel between the opposite walls thereof while being adjustable in height by control of the ballasting of the floats. Thus the floats may close the opposite ends of the trough and in turn may be connected to the opposite walls of the vessel to enable the trough to pivot to either side from its rest position about its longitudinal axis through a limited angle. The floats are so formed that, in this rest or intermediate position, the upper edges of the trough project above the surface of the low density layer on both sides of the trough and prevent the entry of either liquid into the latter. At least one of the floats is provided with means which enables the trough to be pivoted about its longitudinal central axis selectively into intermediate position or into working positions to either side thereof whereby one or the other of the upper edges of the trough can be dipped to a greater or lesser extent beneath the surface of the low density liquid substantially to the interface between the low density and high density liquids.

At least one of the floats is rotationally connected with the trough and is provided with at least one partition running from the bottom of the float to its upper wall and subdividing the float into at least two chambers lying on opposite sides of the vertical plan through the longitudinal axis and containing ballast or trim liquid. The two chambers are connected at their lower portions by a connecting pipe and are each provided at an upper portion with a fitting for the supply or discharge of a pressurizing medium (preferably compressed air) so that the introduction of compressed air into one chamber will displace ballast liquid into the other and pivot the floats around the longitudinal axis of the trough solely by the application of the pressurizing medium.

According to an important feature of the invention, the float, or each float, may be connected to the respective wall of the separating vessel by a system which provides positive guidance for the assembly and, at the same time, permits both the tilting of the trough and the vertical movement thereof to follow the liquid level.

More particularly, the opposite radial walls of the vessel may be provided with respective pairs of vertical rails defining a space between them in which a pivotal pin is vertically guided. The pin projects from the axis of the cylindrical float, at an end wall thereof confronting the wall of the vessel with which it is parallel. It is important to the present invention that the pivot-pin axis coincide with the axis of the cylindrical float and that both these axes coincide with the axis of the trough which, according to the invention, lies in the plane of the surface of the liquid in the vessel, only the parallel horizontal upper edges of the trough projecting slightly above this surface in the intermediate position in which the trough is not canted to either side.

Furthermore, the floats may be provided with adjustable stop means for limiting the angular displacement of the assembly about the aforementioned common axis of the trough, floats and pivot pins, and thereby restrict the depth to which the edges of the trough may be dipped below the surface of the petroleum product overlying the water.

Such means may include a pair of rollers having axis of rotation parallel to the common axis and disposed adjustably to either side of the rail and engageable with an inwardly projecting shank or web thereof in either limiting position of the assembly. When the rollers engage the rail, they impede further canting movement about the common axis, but nevertheless permit vertical movement of the assembly to follow changes in the liquid level.

The adjusting means may include a pair of arcuate slots, centered on the common axis of the system and formed in a segment piece anchored to the float, each slot accommodating a respective axis of one of the limit rollers and being so constructed and arranged as to enable the roller shafts to be locked at selected positions along the slots.

The control means for the system may be designed to block the air inlets and outlets of the compartment in the canted or intermediate position of the trough so as to stabilize the latter in these positions.

DESCRIPTION OF THE DRAWINGS

The above and other objects, features and advantages of the present invention will become more readily apparent from the following description, reference being made to the accompanying drawing in which:

FIG. 6a is a fragmentary perspective view of the trough assembly of FIGS. 1-3 showing the means for connecting the floats to the wall of the separation vessel so as to allow vertical and pivotal movement;

FIG. 6b is a section along line VIb — VIb of FIG. 6a; and

SPECIFIC DESCRIPTION

Figure 1:
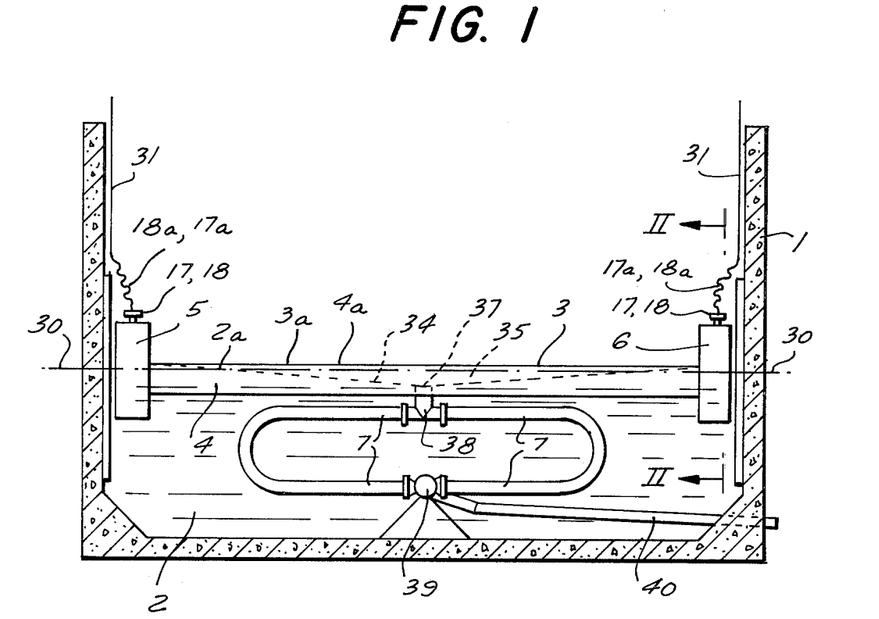
FIG. 1 is a vertical section through an apparatus for separating a relatively low-density liquid from a liquid of limited miscibility therewith and of a higher density.
Figure 2:
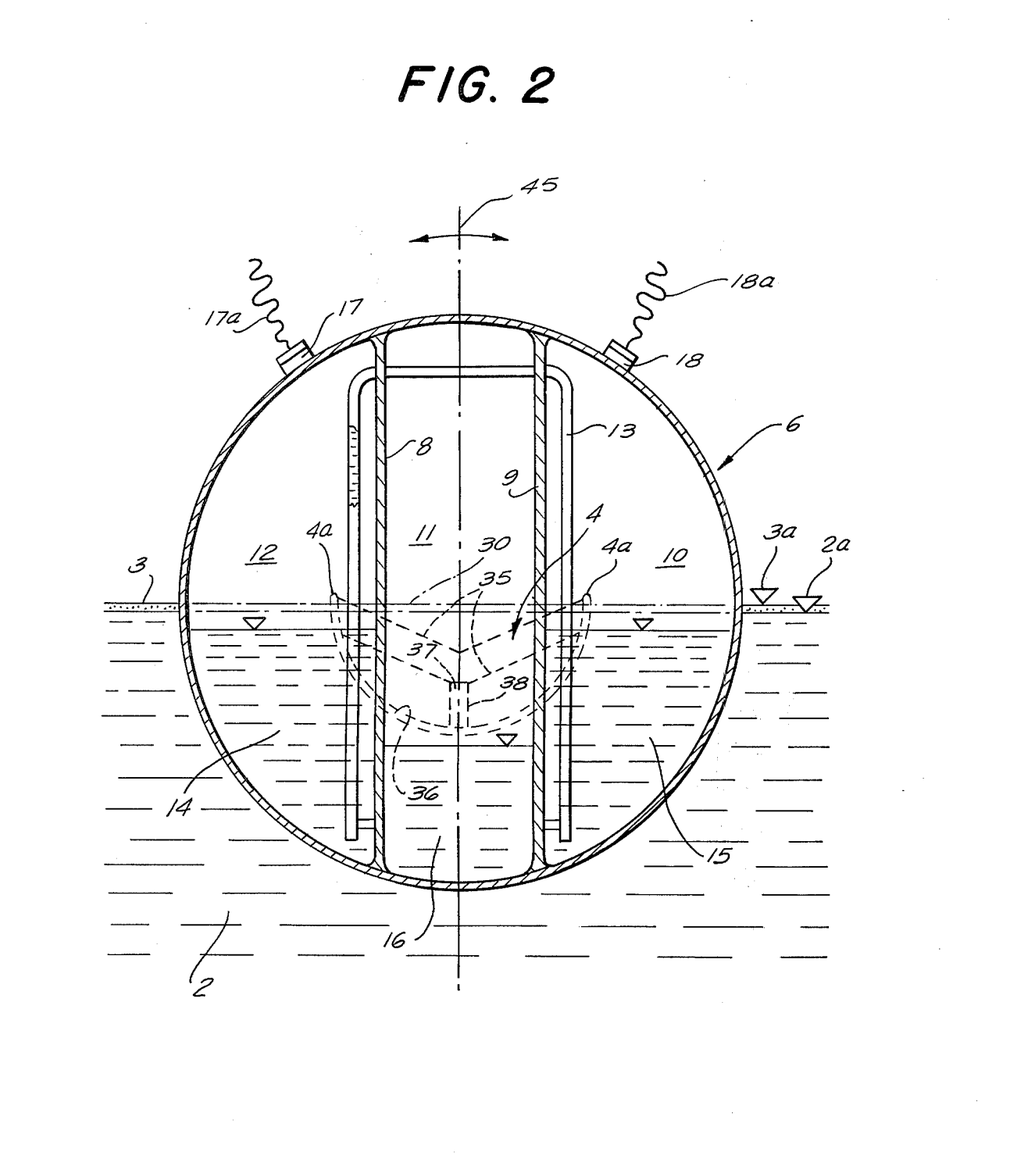
FIG. 2 is a cross-section taken generally along the line II — II of FIG. 1 through one of the two floats of the trough assembly of FIG. 1, the other float being substantially identical thereto.
Figure 3:
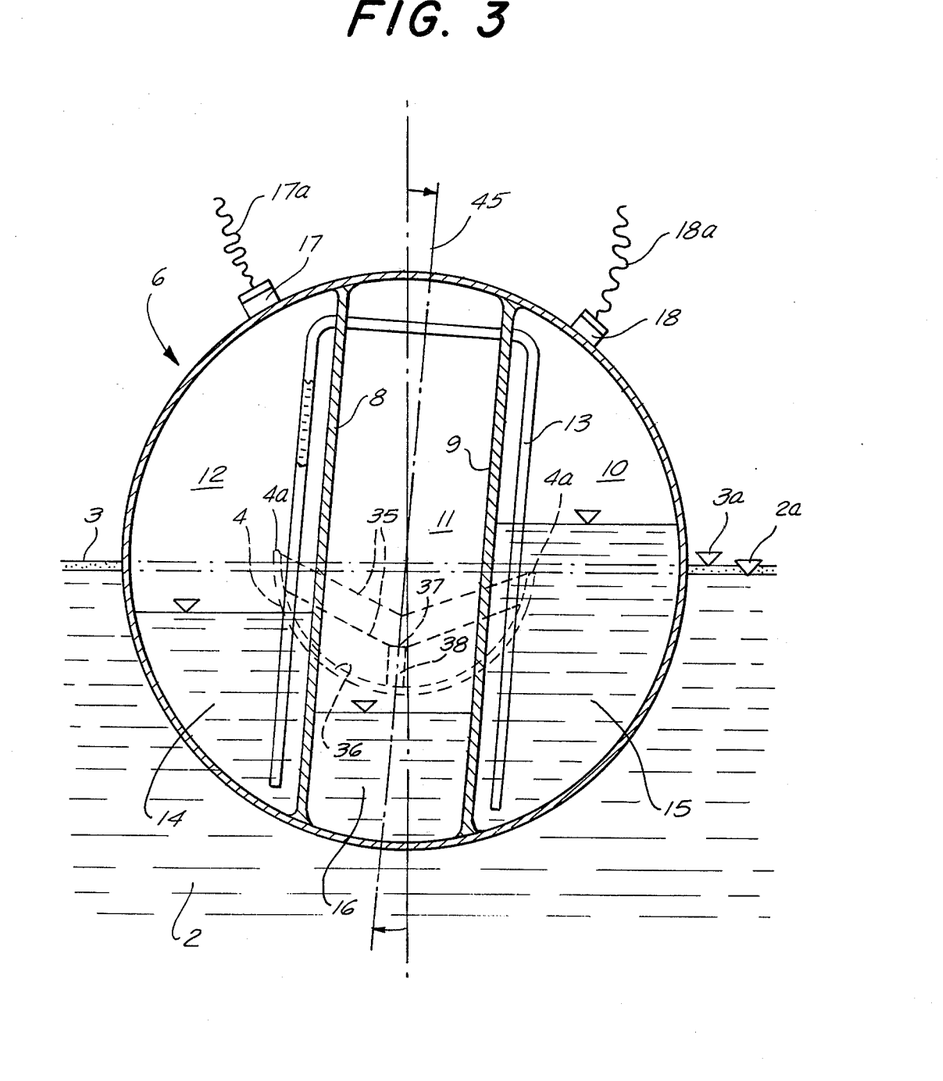
FIG. 3 is a view similar to FIG. 2 but with the trough in a position canted in a clockwise position relative to its position in FIG. 2.

The apparatus of FIGS. 1-3, according to the invention, comprises a separation or settling vessel 1 (e.g. of concrete) for the removal of a relatively low-density liquid 3, e.g. oil or another light petroleum product having an upper surface 3a, from a relatively high-density liquid 2 (e.g. water) which is of limited miscibility with the low-density liquid. The upper surface of the high-density liquid is represented at 2a. The separation takes place as soon as the liquids are introduced into the vessel 1 or after a period sufficient to effect such separation. The discharge of the water partly or completely freed from oil takes place through an outlet (not shown) located below the level 2a.

A trough 4 is supported in the liquids by a pair of floats 5 and 6 rigidly fixed to the upwardly open trough at the opposite ends thereof (FIGS. 1 - 3). The trough 4 is provided at its center bottom with a downwardly extending fitting 38 having a pair of transverse outlets connected to flexible discharge hoses 7. The trough in FIG. 1 is shown in its intermediate position in which the longitudinal axis 30 of angular displacement of the trough is coplanar or flush with the upper surface 3a of the oil layer 3.

In this intermediate position, the rectilinear upper edges 4a (see FIG. 6a) of the trough 4 lie horizontally in a horizontal plane parallel to the upper surface of the oil layer 3 at equal distances thereabove.

Each of the floats 5, 6 has an outer housing of cylindrical configuration with end faces (e.g. 6a in FIG. 6b) closing the respective cylinder and closely juxtaposed with a neighboring parallel surface 31 of the respective side wall of the vessel 1. The opposite end wall 6b of each float is rigid with a respective end of the trough 4 and may be welded thereto so that the axes of the cylinders coincide with axis 30.

The floats 5 and 6 are internally subdivided by upright partitions 8 and 9 into chambers 10, 11 and 12. The two outer chambers (trim chambers) 10 and 12 are connected by an inverted-U bent pipe 13 reaching close to the bottom of each of the trim chambers 10 and 12 of the respective floats.

The bottom-forming parts 34, 35 of the trough are inclined inwardly and downwardly, as shown by broken lines in FIG. 11 toward an outlet bore 37 at the lowest portion of the trough and communicating with the outlet 37.

Figures 6A, 6B:
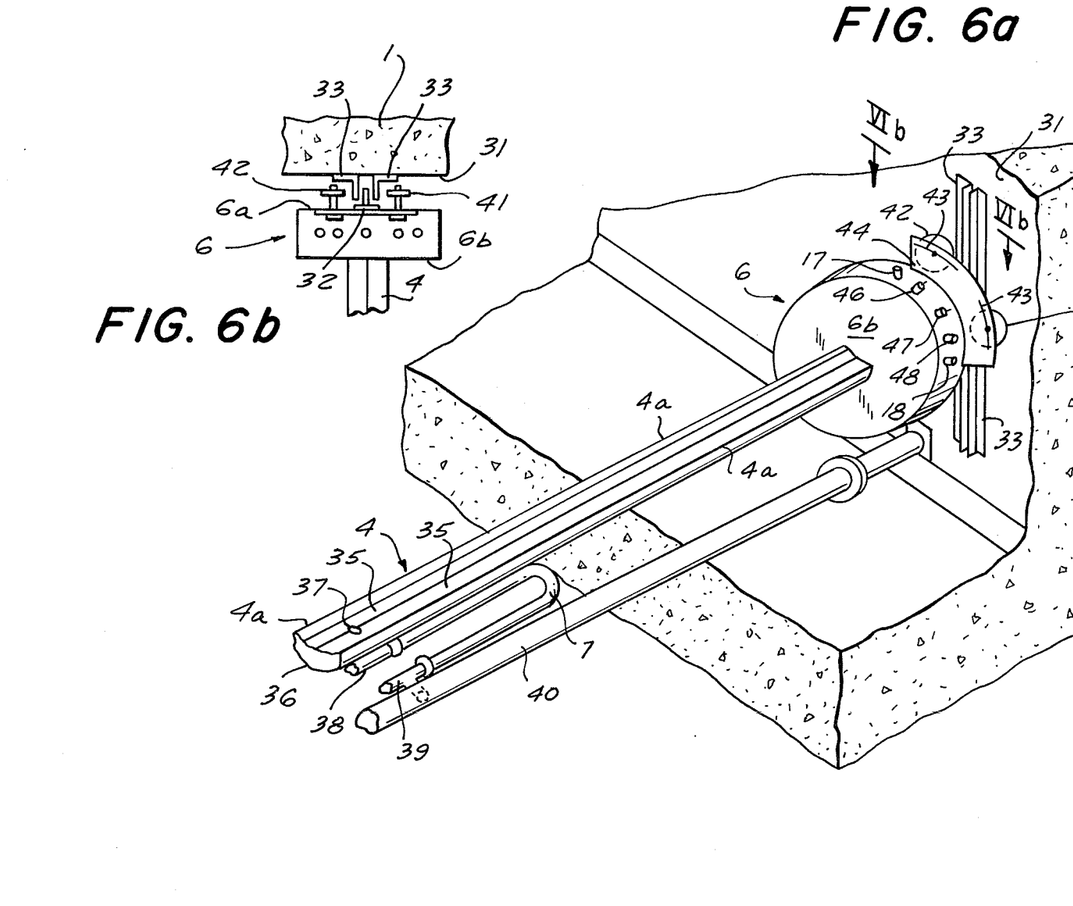

In FIG. 6a only the bottom portion 35 of the trough 4, which extends to the float 6, has been shown. The outlet fitting 38 is a Tee which is connected by flexible hoses 7 to a T-shaped fitting 39 opening into a discharge pipe 40. Members 38, 7, 39 and 40 together form a discharge device for leading off the lighter liquid which flows toward the bore 37 in the trough 37. The pipe 40 passes through a side wall of the vessel 1 to enable the lighter liquid to further worked and/or discharged.

The approximately semicylindrical bottom 36 of the trough 4 serves only to stiffen it.

The intermediate chamber 11 is vented at 5a, 6a, to the atmosphere and is provided at its bottom 5b, 6b connected to a flexible hose 5c, 6c through which ballast water 16 can be supplied to an adjustable level. The trim water in chambers 10 and 12 has been presented at 14 and 15.

The chambers 10 and 12 are provided with fittings 17 and 18 through which the chambers can be charged with compressed air, e.g. via a line 25, or vented selectively via flexible hoses 17a and 18a, respectively connected to these fittings. A pair of guide bars 5d and 5e flank the floats 5 and 6, respectively, to enable their vertical and rotary movement without, however, permitting them to move along the liquid surface.

The control device for the trough assembly 4, 5, 6 of FIGS. 1–3 and 6 comprises a handwheel 19 whose shaft 20 is connected to a stacked switch or valve arrangement 21–24 selectively connecting the compressed air supply 25 and the atmosphere (represented at 26 in FIGS. 4 and 5) with the fitting 17 and 18 as will be described below.

Figure 4:
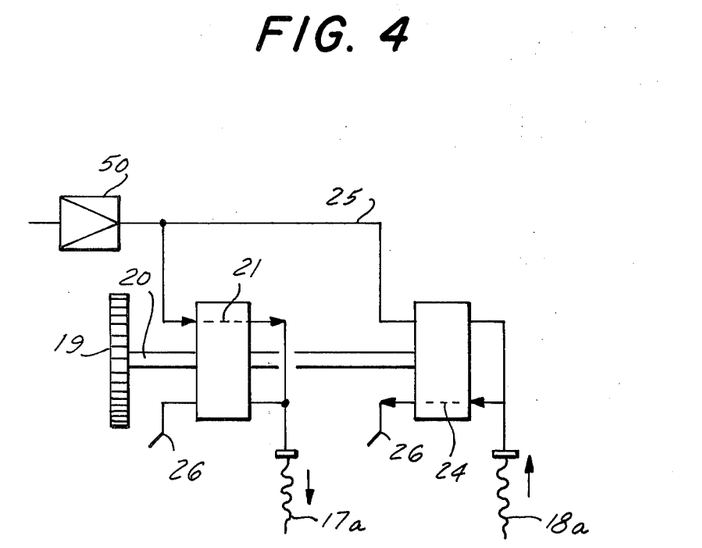
FIG. 4 is a diagram illustrating a control system for the trough of FIGS. 1-3 in one operating condition thereof.
Figure 5:
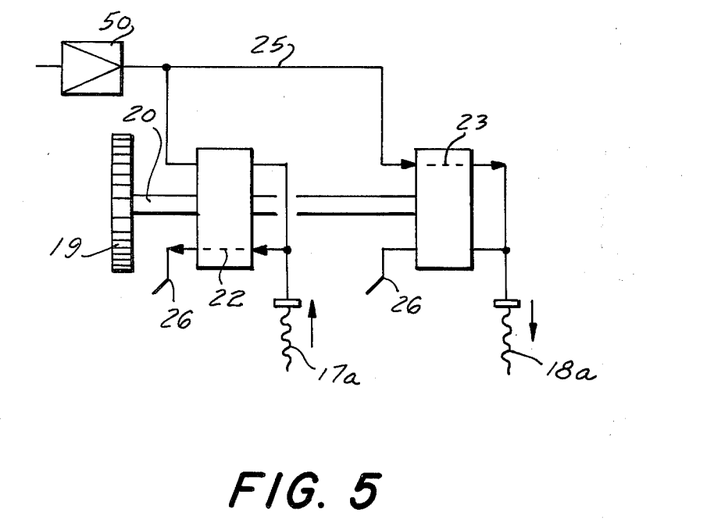
FIG. 5 is a diagram illustrating the control system in another position.
Figure 7:
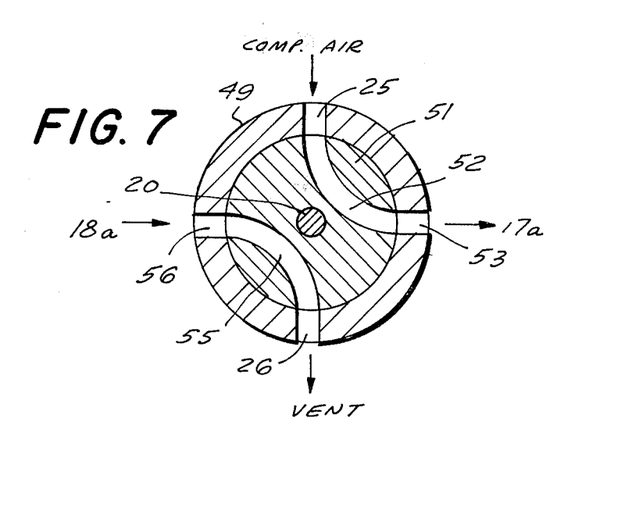
FIG. 7 is a section through a valve adapted to be used in the control system of FIG. 4 or FIG. 5.

A single valve as has been shown in FIG. 7 can replace both valves 21 and 24 in the position shown in FIG. 4 or both valves 23 and 22 in their positions shown in FIG. 5. Valve body 49 of FIG. 7 is formed with a port 25 which is connected by a passage 52 in a rotary valve member 51 with a port 53 communicating with the hose 17a and fitting 17 (FIG. 1).

Another passage 55 simultaneously connects the vent port 26 with a port 56 communicating with a hose 18a of fitting 18.

The valve member 51 is keyed to shaft 20 for rotation therewith. Thus, in one position of the valve, e.g. equivalent to that represented at 21, 24 in FIG. 4, the compressed air port 25 is connected to chamber 10 via its fitting 17 while the other chamber 12 is vented to the atmosphere by port 26 and its fitting 18.

In the other position, equivalent to that represented at 22, 23 in FIG. 5, the compressed air port 25 is connected to port 56 and chamber 12 via fitting 18, whereas the vent port 26 is connected to chamber 10 by its fitting 17. When the valve body 55 is rotated 90° in the clockwise sense, therefore, the pipe 17a communicates with pipe 26 and compressed-air line 25 communicates with pipe 18a.

Thus the system illustrated in FIGS. 1, 6a and 6b comprises an assembly consisting of the removal trough 4 for the low-density liquid supported by floats 5 and 6 in the liquid in vessel 1 so that the upper edges of the trough lie in the rest position thereof, above the surface of the oil film 3. The floats 5 and 6 reach substantially to the walls of the vessel 1.

In FIG. 6b the system for guiding the float 6 and, therefore, the corresponding end of the trough 4 on the juxtaposed surface 31 of the vessel wall. A similar arrangement is used for the other float 5. At the center (axis) of the float 6, projecting outwardly from its end wall 6a is a pivot pin 32 slidably received between the inwardly projecting parallel vertical shanks of a pair of angle-iron rails 33. The pin (and therefore the float) is thus able to rise and lower vertically and to pivot about the axis 30 relative to the wall of the vessel. The trough 4 is thus capable of similar movement. The angular range of pivotal displacement is limited by a pair of limit rollers 41, 42 (see FIGS. 6a and 6b) whose shafts can be locked in position along respective arcuate slots 43 centered on the axis 30 and formed in a segment piece 44 rigid with the float 6. The angular displacement which is admissable can thus be adjusted to limit the depth to which the edges 4a are dipped beneath the surface 3a. In the intermediate position, however, neither roller 41, 42 engages the respective rail 33.

In FIG. 2, the ballast water 14 and 15 is in its rest position and thus have the same height in both outer trim chambers 10 and 12. The median axial plane through each float, represented by the axis 45 perpendicular to axis 30, is thus vertical.

The level of the trough is positioned by supplying ballast through closable fittings 46, 47 and 48 to the chambers 10, 11 and 12 which also serves, in the case of necessity, to discharge the ballast water.

When compressed air at a superatmospheric pressure of, say, 0.2 atmospheres gauge is applied to the fitting 17 of the left trim chamber 12, a portion of the ballast water 14 is displaced via ballast-water-filled tube 13 into the right-hand chamber 10 from which air is displaced to the atmosphere via fitting 18 and the ballast water 15 is augmented. The float rotates in the clockwise sense to swing the trough 4 abouts its axis 30 until its right-hand edge (FIGS. 2 and 3) lies below the level of low-density liquid 3 whereby the low-density liquid collects in the trough with only a minor portion of the highdensity liquid 2 as can be seen from FIG. 3. In this tilted condition hoses 17a and 18a can be closed to hold the trough constant and stable.

The angle through which the trough is canted is readily controlled by the amount of air introduced through fitting 17. To permit the trough to return to its rest position, compressed air is introduced via fitting 18 into the right-hand trim chamber 10 while the fitting 17 is open to the atmosphere. Ballast liquid 15 is thus displaced via tube 13 into the chamber 12.

FIGS. 4 and 5 show the stacked control arrangement according to the invention in two operating modes. Thus the handwheel 19 rotates the shaft 20 to operate the valves 21–24. In the first position (FIG. 4) the valve 21 connects the compressed air supply 25 with fitting 17 of trim chamber 12 and valve 24 connects the fitting 18 of trim chamber 10 with the atmosphere 26. Flow paths represented by valves 22 and 23 are closed. The compressed air drives trim water from chamber 12 into chamber 10 to rotate the float as indicated in the partition between FIGS. 2 and 3.

In an intermediate position, the valves are closed and the floats and trough remain stable in their previous positions.

In a third condition illustrated in FIG. 5, valve 23 connects the compressed air line 25 with the fitting 18 of trim chamber 10 while valve 22 vents trim chamber 12 through fitting 17. Valves 21 and 24 are closed, compressed air is driven from chamber 10 into chamber 12 and the float and trough assembly are rotated in the opposite sense back into their rest position or into a counterclockwise position in which the other edge of the trough dips below the surface of the low-density liquid to decant the latter.

Instead of a manual operation the valves can be provided with a remote-control actuator.

We claim:

1. In a device for withdrawing a light liquid from a heavy liquid upon which the light floats, especially for the removal of oil from water, in which a longitudinally extending trough having a width which is small relative to its length and formed at least in part with an upwardly open channel cross section, is supported in the liquids by floats so that it can be immersed in the liquids to enable only the upper liquid to flow from above into the open upper part of the channel cross section while the heavier liquid is drawn off through an outlet below the trough, the upper edges of the side walls of the trough are horizontal and parallel to one another and lie close to the liquid surface while the longitudinal axis of the trough parallel to these upper edges lies substantially at the level of the liquid surface and the bottom of the trough is formed by parts which converge toward one another and are inclined to the axis of the trough toward a lower outlet opening from which a discharge device leads to the lighter liquid from the trough, the improvement wherein:

the trough is disposed in a vessel containing the liquids to be separated to a variable height;

the floats are disposed at the ends of the trough and close these ends while being provided with means for raising and lowering the trough relative to the liquid levels;

at least one of the floats is provided with an end face juxtaposed with a confronting side wall of the vessel and so connected thereto that the trough is movable relative to the bottom of the vessel upwardly and downwardly and is swingable about its longitudinal axis over a limited angular range in opposite senses from an intermediate position;

in the intermediate position the upper edges of the lateral walls of the trough both lie above the level of the lighter liquid in the vessel and block the admission of both liquids into the trough; and the floats are provided with means for selectively canting the trough in one sense or the other about its axis to selectively immerse the respective upper edge of the trough beneath the surface of the lighter liquid, the latter means including a pair of trim chambers formed in one of said floats, means connecting said trim chambers for liquid communication therebetween, and means for transferring liquid between said chambers without altering the total quantity of liquid in said chambers.

2. In a device for withdrawing a light liquid from a heavy liquid upon which the light liquid floats, especially for the removal of oil from water, in which a longitudinally extending trough having a width which is small relative to its length and formed at least in part with an upwardly open channel cross section, is supported in the liquids by floats so that it can be immersed in the liquids to enable only the upper liquid to flow from above into the open upper part of the channel cross section while the heavier liquid is drawn off through an outlet below the trough, the upper edges of the side walls of the trough are horizontal and parallel to one another and lie close to the liquid surface while the longitudinal axis of the trough parallel to these upper edges lies substantially at the level of the liquid surface and the bottom of the trough is formed by parts which converge toward one another and are inclined to the axis of the trough toward a lower outlet opening from which a discharge device leads the lighter liquid from the trough, the improvement wherein:

the trough is disposed in a vessel containing the liquids to be separated to a variable height;

the floats are disposed at the ends of the trough and close these ends while being provided with means for raising and lowering the trough relative to the liquid levels at least one of the floats is provided with an end face juxtaposed with a confronting side wall of the vessel and so connected thereto that the trough is movable relative to the bottom of the vessel upwardly and downwardly and is swingable about its longitudinal axis over a limited angular range in opposite senses from an intermediate position;

in the intermediate position the upper edges of the lateral walls of the trough both lie above the level of the lighter liquid in the vessel and block the admission of both liquids into the trough; and the floats are provided with means for selectively canting the trough in one sense or the other about its axis to selectively immerse the respective upper edge of the trough beneath the surface of the lighter liquid, said one of said floats being connected with the juxtaposed wall of said vessel by:

a pair of vertical rails mounted on said walls of said vessel and defining a vertical channel between them;

a pin coinciding with the axis of said trough and said one of said floats and projecting from the latter into said channel for vertical guidance therein and pivotal movement about said axis relative to said vessel;

a pair of limit rollers mounted on said one of said floats and flanking said rails while being engageable therewith upon canting of said trough in a respective sense to limit the canting of the trough; and means for selectively adjusting the positions of said rollers about said axis.

3. An apparatus for separating a low-density liquid from a high-density liquid comprising:

a trough disposed in said liquids and having in a rest position two longitudinal edges in which the trough is immersed;

float means located at each end of said trough and constructed and arranged so that ballast selectively positioned in said float means may rotate said two longitudinal edges around the trough's longitudinal axis, one of said float means comprising a hollow compartment with a pair of spaced apart parallel partitions therein with the longitudinal axes thereof arranged in a direction parallel to said trough axis and defining within said one of said float means first and second spaced apart ballast compartments with a floatation compartment therebetween;

fluid inlet means for introducing liquid ballast into at least one of said ballast compartments;

fluid conduit means for conducting liquid ballast from said first to said second ballast compartment and returned; and compressed air means connected to each of said ballast compartments for selectively displacing liquid ballast from one ballast compartment to the other ballast compartment in fluid communication therewith whereby selective displacement of ballast rotates said trough edges around the trough's longitudinal axis adjusting the depth and height of said trough edges relative to the surface of the body of liquids in which said trough is disposed.

4. The apparatus defined in claim 3 wherein said trough has a bottom converging downwardly toward an outlet, a longitudinal axis of said trough lying in a plane of the level of said low-density liquid, said compressed air means including stacked control means for selectively feeding compressed air to one of said ballast compartments while venting the other outer ballast compartment above the liquid therein and vice versa.

5. The apparatus defined in claim 3 wherein said trough has a bottom inclined downwardly and converging toward a discharge location, and a fitting at said location for discharging collected liquid from said trough, said trough having a length substantially greater than said width.

6. The apparatus defined in claim 3 wherein said fluid conduit means is a connecting pipe opening into both of said ballasted compartments close to the bottom thereof.

* * * * *